United States Patent Office 3,629,349
Patented Dec. 21, 1971

3,629,349
PROCESS FOR PRODUCING CYCLODODECATRIENE
Jo Itakura, Hisao Tanaka, and Hiroo Ito, Nagoya, Japan, assignors to Toagosei Chemical Industry Co., Ltd., Tokyo, Japan
No Drawing. Filed Nov. 13, 1969, Ser. No. 876,606
Claims priority, application Japan, Nov. 20, 1968, 43/84,540
Int. Cl. C07c 3/10
U.S. Cl. 260—666 B  3 Claims

ABSTRACT OF THE DISCLOSURE 1,5,9-cyclododecatriene is prepared by cyclotrimerizing conjugated diolefines in the presence of a relatively moisture-stable catalyst composition obtained by mixing alkoxytitanium-acetoacetate complex compound with alkylaluminum chloride.

---

The present invention relates to a process for producing 1,5,9-cyclododecatriene and substituted 1,5,9-cyclododecatriene by the cyclo-trimerization of conjugated diolefines.

1,5,9-cyclododecatriene obtained by the process of the invention is not only an intermediate for nylon-12, but also raw material for various useful organic compounds.

In the method for synthesizing 1,5,9-cyclododecatriene (hereinafter described abbreviatedly as CDT) from butadiene, some catalysts therefor have been made heretofore. For example, a catalyst in combination of titanium halide with organic aluminum compound, a catalyst of nickel complex compound or the like have been known.

The object of the present invention is to provide a cyclotrimerization process for conjugated diolefines by use of a catalyst composition having higher catalyst reactivity for the cyclotrimerization but very slow rate-reactivity to moisture in the air.

Much efforts have been made precisely in respect to the catalyst to obtain CDT from butadiene, and it has found that CDT may be obtained in a good yield by using two component catalyst comprising alkoxytitanium-acetoacetate complex compound which is obtained by the reaction between tetraalkoxy titanium and alkyl acetoacetate, and alkylaluminum chloride. Thus, the present invention has been accomplished.

Among the catalyst components to be used in the process of the present invention, alkoxytitanium-acetoacetate complex compound is represented by the general formula,

(wherein R and R′ represent an alkyl group, and $n$ is an integer of 2 or 3), which has been publicly known in J. Amer. Chem. Soc., 79, 4344 (1957) or other literatures. The complex compounds as represented by said general formula may be easily prepared by mixing tetraalkoxytitanium and alkyl acetoacetate in generally molar ratio of 1:1 or 1:2. Most of them are distillable and are solid or liquid at a room temperature. They have usually an advantage which is easy in handling, because its reactivity to moisture in air is very small as compared with titanium tetrachloride or tetraalkoxytitanium.

In the complex compounds represented by the above-mentioned general formula, there are enumerated as R an alkyl group such as methyl, ethyl, n-propyl, isopropyl, n-butyl, isobutyl, secondary butyl, tertiary butyl, n-pentyl, isopentyl, n-hexyl, n-heptyl, n-octyl, isooctyl, 2-ethylhexyl and the like, and as R′, an alkyl group such as methyl, ethyl, n-propyl, isopropyl, n-butyl, isobutyl, secondary butyl, tertialy butyl, n-pentyl, n-hexyl, n-heptyl, n-octyl, isooctyl, 2-ethylhexyl and the like.

As the typical examples of the above-mentioned complex compounds, there is mentioned the compound in which an alkoxy group belongs to the following group [A] and alkyl acetoacetate to group [B], or the compound in which an alkoxy group belongs to the group [C] and alkyl acetoacetate to the group [D].

[A]: Diethoxy, di-n-propoxy, di-i-propoxy, di-n-butoxy, diisobutoxy, di-sec.-butoxy, di-tert.-butoxy, di-n(-pentyloxy), di-(i-pentyloxy), di-(n-hexyloxy), di-(n-heptyloxy), di(n-octyloxy), di-(i-octyloxy), bis-(2-ethylhexyloxy) and the like,

[B]: Bis-(methylacetoacetate), bis(ethylacetoacetate), bis(n-propylacetoacetate), bis-(i-propylacetoacetate), bis-(n-butylacetoacetate), bis-(i-butylacetoacetate), bis(sec.-butylacetoacetate), bis-(tert.-butylacetoacetate), bis-(n-pentylacetoacetate), bis-(n-hexylacetoacetate), bis-(n-heptylacetoacetate), bis-(n-octylacetoacetate), bis-(i-octylacetoacetate), bis-(2-ethylhexylacetoacetate) and the like,

[C]: Triethoxy, tri-n-propoxy, tri-i-propoxy, tri-n-butoxy, tri-i-butoxy, tri-sec.-butoxy, tri-tert.-butoxy, tri-(n-pentyloxy), tri-(i-pentyloxy), tri-(n-hexyloxy), tri-(n-heptyloxy), tri-(n-octyloxy), tri-(i-octyloxy), tri-(2-ethylhexyloxy) and the like,

[D]: Methyl acetoacetate, ethyl acetoacetate, n-propyl acetoacetate, i-propyl acetoacetate, n-butyl acetoacetate, i-butyl acetoacetate, sec.-butyl acetoacetate, tert.-butyl acetoacetate, n-pentyl acetoacetate, n-hexyl acetoacetate, n-heptyl acetoacetate, n-octyl acetoacetate, i-octyl acetoacetate, 2-ethylhexyl acetoacetate and the like.

An alkyl aluminum chloride which is another component of the catalyst is represented by the general formula, $R''_m AlCl_{3-m}$ (wherein $R''$ represents an alkyl group, and $m$ is a number of $1.5 \leq m \leq 2$). Examples are methyl aluminum chlorides, propyl aluminum chlorides, butyl aluminum chlorides, and preferably diethyl aluminum chloride and ethyl aluminum sesquichloride. It goes without saying that an ethyl aluminum chloride having a composition between diethyl aluminum chloride and ethyl aluminum sesquichloride are also useful.

An effective catalyst for synthesizing CDT can be prepared by mixing the above-mentioned two components in an inert solvent, preferably heating and ageing at 60° to 80° C. In this case, it is favourable that the mixing ratio of the complex compound to alkyl aluminum chloride lies in 1:10 to 1:500 as a ratio of titanium atom to aluminum atom. As the above-mentioned inert solvent, aliphatic, alicyclic or aromatic hydrocarbons or halogenides thereof may be used, and particularly benzene, toluene xylene and the like are often used.

As the mode of trimerization of butadiene using the catalyst prepared in the aforementioned manner, either of batch method using an autoclave worked under superatmospheric pressure or blowing type reactor, worked under atmospheric pressure, or completely continuous method using a reaction tube, may be employed. As to the reaction solvent in this case, ones which can be used for preparation of the above-mentioned catalyst may be also used herein, and conventionally benzene, toluene, xylene, cyclododecatriene and mixed ones thereof are frequently used. The concentration of the catalyst used in the reaction system may be sufficient in such a small amount as about 0.01 milligram atom of titanium in 1 l. of the reaction system. The reaction temperature may be employed in a range of −20° to 150° C., but preferable temperature lies in 20° to 80° C. After the reaction, CDT can be obtained in a good yield as a main product by adding a small amount of alcohol, water or dilute acid, removing the catalyst residue formed, removing solvent by distillation, and then subjecting the crude CDT to steam-distillation or distillation in vacuo.

The present invention will be hereinafter concretely explained by the following examples.

EXAMPLE 1

At first, according to the method by A. Yamamoto and S. Kanbara [J. Amer. Chem. Soc., 79, 4344 (1957)], di-isopropoxytitanium - bis - (ethyl acetoacetate) was synthesized as follows. A flask equipped with stirring and dropping devices was urged with nitrogen gas, and 0.1 mol of tetraisopropoxy titanium was added thereinto. 0.2 mol of ethyl acetoacetate was added dropwise by means of the dropping device at a temperature of 20° to 30° C. and the reaction was carried out with cooling and stirring. After adding ethyl acetoacetate, the reaction was continued for additional 10 minutes, n-butanol formed was removed by distilling in vacuo. Then, di-isopropoxy-titanium-bis-(ethyl acetoacetate) was obtained as a pale yellow liquid in a good theoretical yield of more than 90%, by conducting a distillation under a high vacuo. The elementary analysis was as follows: C: 51.6 (50.9), H: 7.7 (7.60), Ti: 11.1 (11.3)%. (The figures in the brackets are theoretical values.)

Thereafter, the trimerization reaction was carried out by using the above-mentioned titanium compound as the catalyst component. That is, into a pressure glass tube having a volume of about 100 ml., 0.033 mil. mol of di-isopropoxytitanium-bis-(ethyl acetoacetate), 20 ml. of benzene and 0.5 mil. mol of ethyl aluminum sesquichloride (($C_2H_5$)$_3Al_2Cl_3$) were charged under an argon atmosphere. The reaction tube was maintained at 80° C. for 15 minutes and shaken occasionally. The mixture was cooled to —78° C., and 14.6 g. (0.27 mol) of dry butadiene was charged. The reaction tube was sealed, and the reaction was effected for 5 hours by maintaining the tube in a thermostat with shaking apparatus. After reaction, 1 ml. of ethanol was added to the system to inactivate the catalyst, and then benzene of the solvent was removed by distillation. As the result of conducting the reduced pressure ditillation, 11.7 g. of 1,5,9-cyclododecatriene having a boiling point of 97° to 98° C./10 mm. Hg was obtained. The theoretical yield corresponded to 80% based on butadiene charged.

EXAMPLE 2

0.067 millimol of di-isopropoxytitanium - bis - (ethyl acetoacetate) synthesized in the same manner as in Example 1 and 2.0 millimols of di-ethyl aluminum chloride were mixed in 20 ml. of benzene according to the method in Example 1 and was further heated at 80° C. for 15 minutes to prepare the catalyst.

The charging of butadiene, reaction and treatment after the reaction, were carried out in the same manner as in Example 1. As the result, 9.3 g. of CDT were obtained. The theoretical yield corresponded to 64% based on butadiene charged.

EXAMPLES 3–5

Into a four-necked flask equipped with an agitator, a gas blowing tube and a thermometer, 100 ml. of benzene, ethyl aluminum sesquichloride (abbreviated to $Et_3Al_2Cl_3$) and diisopropoxytitanium-bis-(ethyl acetoacetate) were charged in amounts as shown in Table 1 under a nitrogen atmosphere and heated at 80° C. for 15 minutes. Then, the system was cooled to 40° C., and 54 g. of dry butadiene were introduced thereinto through the gas blowing tube over a period of 2 hours. After reaction, 10 ml. of ethanol was added to inactivate the catalyst, benzene was removed by distillation, and then CDT was separated by distillation under reduced pressure. Apart from this, one part of the reaction liquid was subjected to gas chromatography test (abbreviated to gas chro in the below tables) to analyze the amount of CDT produced. From these results, the conversion of butadiene and selectivity of CDT were shown in Table 1.

TABLE 1

| Example | Diisopropoxy-titanium-bis-(ethyl acetoacetate) (mil. mol) | $Et_3Al_2Cl_3$ (mil. mol) | Conversion of butadiene (percent) | | Selectivity of CDT (percent) | |
|---|---|---|---|---|---|---|
| | | | Distillation value | Gas chro value | Distillation value | Gas chro value |
| 3 | 0.055 | 5.5 | 92.5 | 97.5 | 89.1 | 90.0 |
| 4 | 0.039 | 7.8 | 94.7 | 95.3 | 90.2 | 90.4 |
| 5 | 0.037 | 3.7 | 92.8 | 94.3 | 89.4 | 89.8 |

EXAMPLES 6–12

Various alkoxytitanium acetoacetate complex compounds shown in Table 2 were synthesized according to the same method as in Example 1. (The elementary analysis values of the compounds which have never been described in the literature were shown in Table 3.)

Using the same apparatus as in Examples 3–5, 100 ml. of benzene, 5.5 mil. mol of $Et_3Al_2Cl_3$ and 0.055 mil. mol of titanium complex compound in amounts as shown in Table 2 were mixed under a nitrogen atmosphere and heated at 60° C. for 15 minutes to prepare the catalyst solution. 54 g. of dry butadiene were introduced into the catalyst solution while stirring at 40° C. over 2 hours. In the same manner as in Examples 3–5, the distilling separation and gas chromatography tests were carried out to obtain the results in Table 2.

TABLE 2

| Example | Complex compound | Conversion of butadiene (percent) | | Selectivity of CDT (percent) | |
|---|---|---|---|---|---|
| | | Distillation value | Gas chro value | Distillation value | Gas chro value |
| 6 | Diisopropoxytitanium-bis-(ethyl acetoacetate) | 92.5 | 97.5 | 89.1 | 90.0 |
| 7 | Diisopropoxytitanium-(ethyl acetoacetate) | 91.4 | 93.2 | 89.1 | 89.3 |
| 8 | Dibutoxytitanium-bis-(methyl acetoacetate) | 97.1 | 95.7 | 94.2 | 94.1 |
| 9 | Tributoxytitanium-(ethyl acetoacetate) | 90.3 | 93.7 | 90.6 | 90.8 |
| 10 | Tributoxytitanium-(methyl acetoacetate) | 97.2 | 99.0 | 90.9 | 91.1 |
| 11 | Diethoxytitanium-bis-(ethyl acetoacetate) | 96.8 | 96.2 | 89.9 | 89.8 |
| 12 | Tripropoxytitanium-(ethyl acetoacetate) | 95.5 | 95.8 | 91.0 | 91.1 |

| Complex compound | Elementary analysis percent | | |
|---|---|---|---|
| | C | H | Ti |
| Triisopropoxy titanium-(ethyl acetoacetate) | 51.3 (50.9) | 8.7 (8.5) | 13.5 (12.5) |
| Dibutoxytitanium-bis-(methyl acetoacetate) | 51.4 (50.9) | 7.8 (7.6) | 11.6 (11.3) |
| Tributoxytitanium-(methyl acetoacetate) | 53.8 (53.4) | 9.1 (9.0) | 12.1 (12.5) |

The figures in the brackets are theoretical values.

EXAMPLE 13

Trimerization of butadiene was carried out in the same manner as in Example 3 except that 100 ml. of dehydrated toluene was used as a solvent instead of benzene. In this case, 44.9 g. of CDT and 5.3 g. of by-product having a high boiling point were obtained in blowing 54 g. of butadiene. Therefore, the conversion of butadiene and selectivity of CDT were 92.9% and 89.4%, respectively.

EXAMPLE 14

The reaction was carried out in the same manner as in Examples 3–5 except that 5.5 mil. mol of ethyl aluminum sesquichloride and 0.055 mil. mol of di-(n-octyloxy) titanium-bis-(ethyl acetoacetate) were used as the catalyst. As a result of conducting the distillation analysis, the conversion of butadiene and selectivity of CDT were 89.2% an 85.2%, respectively.

EXAMPLE 15

The reaction was carried out in the same manner as in Examples 3–5 except that 5.5 mil. mol of ethyl aluminum sesquichloride and 0.055 mil. mol of di-n-butoxy-titanium-bis-(n-octyl acetoacetate) were used as the catalyst. As a result of the distillation analysis, the conversion of butadiene and selectivity of CDT were 92.3% and 78.8%, respectively.

While the above has been described in connection with preferred embodiments of this invention, it will be obvious to those skilled in the art that various changes and modifications may be made therein without departing from the invention and it is aimed, therefore, to cover in the appended claims all such changes and modifications as falling within the true spirit and scope of this invention.

What is claimed is:
1. A process for producing 1,5,9-cyclododecatriene comprising contacting 1,3-butadiene at a temperature of from 20° to 80° C. in liquid phase with a catalyst composition prepared by mixing (1) an alkoxytitanium-acetoacetate complex represented by the formula,

$$(RO)_nTi(CH_3COCHCOOR')_{4-n}$$

wherein R and R' each represent an alkyl group, and $n$ represents an integer of 2 or 3, and (2) an alkylaluminium chloride represented by the formula, $$R''_mAlCl_{3-m}$$

wherein R'' represents an alkyl group and $m$ is a number from 1.5 to 2 inclusive, to trimerize said 1,3-butadiene, the mixing proportion of the alkylaluminum chloride and the alkoxytitanium-acetoacetate complex being within a range of 10–500 gram-atoms of aluminum per one gram-atom of titanium.

2. The process according to claim 1, wherein the alkylaluminum chloride is ethylaluminum sesquichloride.

3. The process according to claim 1, wherein the alkoxytitanium-acetoacetate complex represented by the formula, $$(RO)_nTi(CH_3COCHCOOR')_{4-n}$$

wherein $n$ is an integer of 2 or 3, R is propyl or butyl group and R' is methyl, ethyl, propyl or butyl group, is used.

References Cited

UNITED STATES PATENTS 3,280,205  10/1966  Yosida et al. _____ 260—666 B

FOREIGN PATENTS 1,325,966  7/1966  Japan _____ 260—666 B

DELBERT E. GANTZ, Primary Examiner

V. O'KEEFE, Assistant Examiner